United States Patent [19]
Monson

[11] Patent Number: 5,866,023
[45] Date of Patent: Feb. 2, 1999

[54] PORTABLE BARCODE LABEL PRINTER BATTERY SWITCHING CIRCUIT

[75] Inventor: Gavin Martin Monson, Fairfield, Ohio

[73] Assignee: Monarch Marking Systems, Inc., Dayton, Ohio

[21] Appl. No.: 887,790

[22] Filed: Jul. 3, 1997

[51] Int. Cl.$^6$ .................................................. G06K 7/10
[52] U.S. Cl. .......................... 235/472; 235/383; 235/492
[58] Field of Search .................................... 235/383, 472, 235/492; 395/750.08

[56] References Cited

U.S. PATENT DOCUMENTS 5,797,024   8/1998   Gochi .................................. 395/750.08

*Primary Examiner*—Harold Pitts
*Attorney, Agent, or Firm*—McAndrews, Held & Malloy, Ltd.

[57] ABSTRACT

A portable barcode printer includes a circuit coupled between a main battery and a read/write memory of the printer to provide power to the memory from the main battery with a minimal voltage drop across the circuit. The circuit is also coupled between the main battery and a backup battery to prevent leakage current from the backup battery from flowing through the circuit. The circuit in includes a P-channel field effect transistor having a drain coupled to the main battery and a source coupled to the read/write memory. A N-channel field effect transistor having a source connected to ground has its drain connected to the gate of the P-channel field effect transistor so that when the N-channel field effect transistor is turned, on the P-channel field effect transistor is turned on and driven to saturation to allow a positive current flow from the drain to the source of the P-channel field effect transistor.

20 Claims, 1 Drawing Sheet

PORTABLE BARCODE LABEL PRINTER BATTERY SWITCHING CIRCUIT

TECHNICAL FIELD

The present invention is directed to a portable barcode label printer battery switching circuit and more particularly to such a circuit that is coupled between a main battery and a read/write memory of the barcode, label printer to provide power to the memory from the main battery with a minimal voltage drop across the circuit, the circuit also being coupled between the main battery and a backup battery to prevent leakage current from flowing from the backup battery through the circuit.

BACKGROUND OF THE INVENTION

Portable battery powered barcode label printers are known that use a static random access memory to store information, such as programmable software routines and/or programmable font and format data which is necessary for the intended operation of the label printer. This information generally remains fixed over numerous operations of the label printer and until the label printer is reprogrammed. This is opposed to the data to be printed which changes frequently. One such printer is described in U.S. Pat. No. 5,483,624.

However, when such a memory is used to store information that is necessary for the intended operation of the printer, a minimum voltage must be applied to the static RAM to ensure that the stored information is maintained therein and not lost or corrupted. In order to ensure that the static RAM is always powered sufficiently to maintain necessary, stored information intact therein, prior portable label printers have included a backup battery in addition to a main battery as described in U.S. Pat. No. 4,724,033.

An example of the circuitry connecting the main battery and backup battery to a memory such as a static RAM as was used in the prior art is depicted in FIG. 3. As shown therein, +Vcc, which is the regulated voltage provided from the main battery via a voltage regulator is coupled to a static RAM which is powered by +Vmem through a Shottky diode 10 wherein the anode of the diode 10 is connected to +Vcc. A second Shottky diode 12 having its cathode connected to the cathode of the diode 10 with its anode coupled to a backup battery via a resistor 14. It has been found that this circuit contributes to failure of the static RAM and/or corruption of the data therein due to the large voltage drop across the Shottky diode 10 which may be as large as 0.5V–1V. It has also been found that there is leakage current from the backup battery across the Shottky diode 10 which is undesirable and could cause a draining of the backup battery too quickly.

BRIEF SUMMARY OF THE INVENTION

The portable barcode, label printer battery switching circuit of the present invention is directed to overcome the disadvantages of prior battery switching circuits as discussed above. The portable barcode printer battery switching circuit of the present invention is coupled between a main battery and a read/write memory of the printer to provide power to the memory from the main battery with a minimal voltage drop across the circuit. The circuit is also coupled between the main battery and a backup battery to prevent leakage current from flowing from the backup battery through the circuit.

More particularly, in accordance with the present invention a read/write memory stores information for controlling one or more operations of the barcode printer. A main battery is coupled to the memory to provide power to the memory under normal conditions. A backup battery is also coupled to the memory to provide power thereto when necessary. The circuit coupled between the main battery and the memory and coupled between the main battery and the backup battery includes a P-channel field effect transistor having a drain coupled to the main battery and a source coupled to the read/write memory. The circuit also includes a N-channel field effect transistor having a source connected to ground and a drain connected to the gate of the P-channel field effect transistor so that when the N-channel field effect transistor is turned on, the P-channel field effect transistor is turned on and saturated to allow a positive current flow from the drain to the source of the P-channel field effect transistor when the main battery is providing power to the memory. When operated as such, there is a minimum voltage drop across the circuit on the order of 1 millivolt.

These and other advantages and novel features of the present invention, as well as details of an illustrated embodiment thereof, will be more fully understood from the following description and drawings.

DETAILED DESCRIPTION OF THE INVENTION

Figure 1:
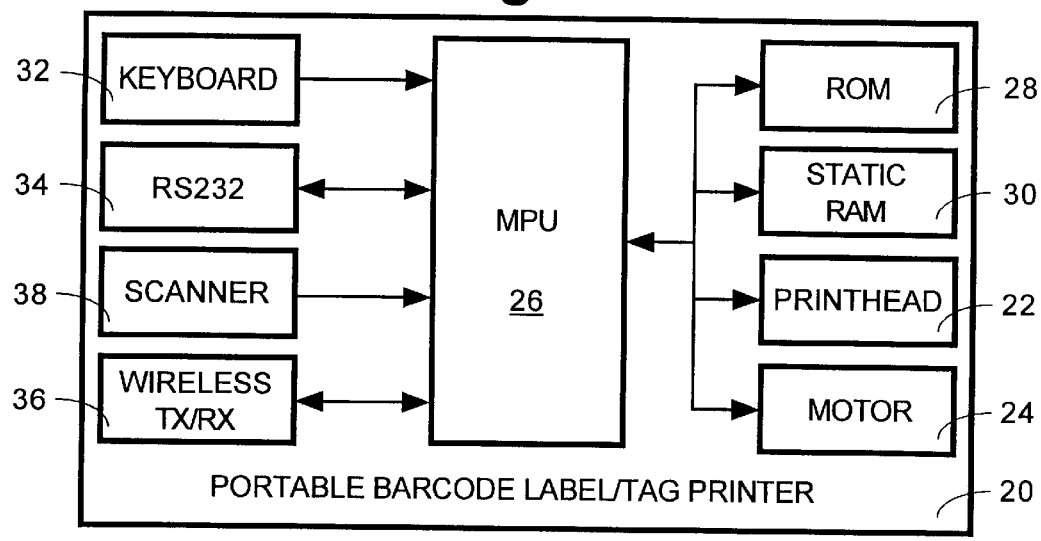
FIG. 1 is a block diagram of a portable barcode label printer incorporating the circuitry of the present invention.

A barcode label printer 20 in accordance with the present invention, as shown in FIG. 1, includes a printhead 22 for printing barcode and alpha-numeric data on a web of record members such as tags and labels that are driven by a motor 24 with respect to the printhead 22. A microprocessor 26 controls the operation of the printhead 22 and motor 24 in accordance with fixed software routines stored in a ROM 28 and programmable software routines stored in a read/write memory 30 that may be a static RAM or the like. The read/write memory 30 also stores programmable fonts and formats as well as other information that may vary over time but that is generally to remain fixed over many uses of the printer wherein the printer is turned off between uses.

A keyboard 32 is coupled to the microprocessor 26 to allow a user to enter data to be printed. A RS232 port 34 may also be used to enter data from a host device such as a host computer for hard wired communications; and for wireless communications a long or short range radio frequency receiver 36 may be used. The wireless communication device 36 preferably also includes a transmitter so that the printer 20 can communicate information to a host device as well. A barcode scanner 38 may be used to enter data for transmission to the host device by the wired connection 34 or wireless connection 36 and to enter barcode data to be printed by the printhead 22. It is noted that barcode data for printing by the printhead 22 may also be input by any of the other input devices 32, 34 and 36 as is well known. It will be appreciated that the scanner 38 and/or wireless transmitter/receiver 36 can be contained within the housing of the printer 20 or can be connected thereto via a wired connection or a wireless connection that may, for example, include an infrared transmitter and receiver. The print data differs from the programmable information stored in the read/write memory 30 which includes software, fonts, formats etc., in that the print data generally changes between uses and may even many times during a single use. For example, the print data may change each time a label or a tag is printed. If this print data is lost, it can be re-entered fairly easily by the user of the printer 20. However, if the programmable software, fonts, formats, etc., necessary for the operation of the printer 20 are lost, the user of the printer 20 generally does not have the expertise necessary to replace this information. In order to protect the read/write memory 30 that stores the programmable information necessary to operate the printer 20, the printer of the present invention includes a main battery 40 to provide power to the read/write memory 30 under normal conditions and the printer also includes a backup battery 42 to provide power to the memory 30 when the main battery drops below a threshold or is removed from the printer.

The printer 20 of the present invention also includes a circuit generally designated 44 that ensures a minimum voltage will be applied to the read/write memory 30 from the main battery with a minimal voltage drop thereacross, the circuit 44 also preventing leakage current from the backup battery 42 from flowing through the circuit 44. Thus, the programmable information that is stored in the read/write memory 30 that is necessary for the operation of the printer and that generally remains fixed between multiple uses of the printer is maintained intact in the memory 30.

Figure 2:
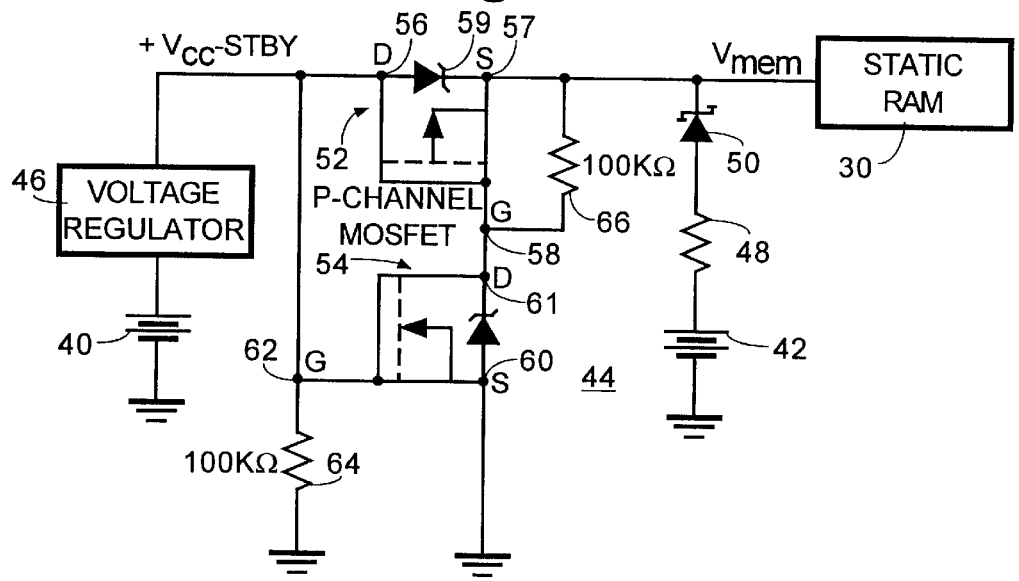
FIG. 2 is a circuit diagram of the main battery/backup battery switching circuit for the barcode label printer of FIG. 1.
Figure 3:
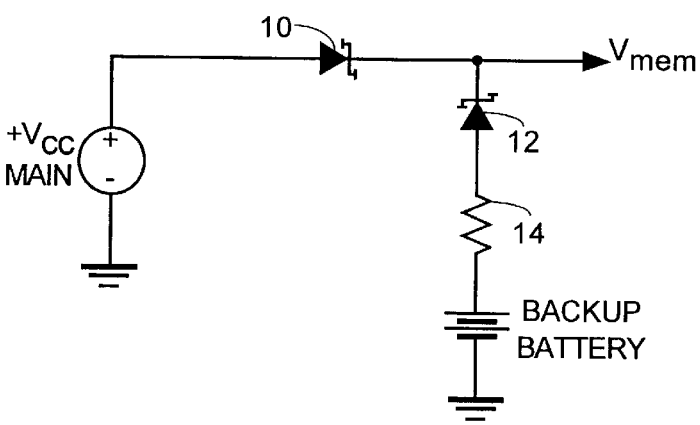
FIG. 3 is a circuit diagram of a prior art main battery/backup battery switching circuit.

More particularly, as shown in FIG. 2, the printer 20 includes a NiCad main battery 40 that is coupled to a voltage regulator 46 for providing a voltage, +Vcc_STBY, to the read/write memory 30 under normal operating conditions of the printer 20 including a printing operation as well as a standby mode wherein the printer 20, is in essence, turned off. As an example, the regulated voltage, +Vcc_STBY, may be 5 volts. To maintain the voltage, Vmem applied to the read/write memory 30 above the minimum required by the memory 30 to maintain data stored therein intact, i.e. not corrupted or lost, the circuit 44 results in only a minimal voltage drop thereacross. The circuit 44 isolates the main battery 40 and associated circuitry including the voltage regulator 46 from the backup battery 42 and further provides battery switching so that when the main battery 40 drops below a particular level or is otherwise removed, actually or in effect, from the circuitry of the printer 20, the circuitry 44 switches so that the voltage, Vmem for maintaining power to the read/write memory 30 is provided by the backup battery 42. The backup battery 42 may be a Lithium battery and is coupled to the read/write memory 30 via a 1KΩ resistor 48 and a Shottky diode 50. When +Vcc_STBY is provided by the main battery 40, the Shottky diode 50 is reversed biased so that power is not provided to the memory 30 from the lithium battery 42 but from the main battery 40.

The circuit 44 includes a P-channel field effect transistor and in particular a MOSFET as well as a N-channel field effect transistor, or specifically a MOSFET 54. The P-channel MOSFET 52 has its drain 56 coupled to +Vcc_STBY from the main battery 40; whereas the source 57 of the P-channel MOSFET 52 is connected to the static RAM 30 to provide Vmem thereto. The gate 58 of the P-channel MOSFET 52 is connected to the drain 61 of the N-channel MOSFET 54, the source 60 of which is connected to ground so that when the N-channel MOSFET 54 is turned on, it turns on the P-channel MOSFET 52 so that the P-channel MOSFET 52 is saturated. This allows positive current flow from the drain 56 of the P-channel MOSFET 52 to the source 57 of the P-channel MOSFET with a zener diode 59, coupled therebetween, being slightly forwardly biased. This arrangement results in an extremely small voltage drop across the circuit 44 when Vmem is being provided by the main battery 40, this minimal voltage drop being on the order of one millivolt.

The gate of the N-channel MOSFET 54 is coupled between the regulated main battery voltage, +Vcc_STBY, and a 100KΩ resistor 64 that is in turned connected to ground. When the voltage, +_Vcc_STBY, drops to a certain level, the resistor 64 dissipates the charge on the gate 62 of the N-channel MOSFET 54 to turn the MOSFET 54 off. It will be appreciated that the gate of the N-channel MOSFET 54 may alternatively be coupled between a different gate signal generator and the resistor 66 wherein the generator provides a gate signal at a desired time to turn the N-channel MOSFET on. For example, the gate signal may be generated by a comparator or the like that compares a value representing the main battery voltage to a reference voltage to turn off the gate signal and thus the N-channel MOSFET 54 when the battery voltage drops below the reference voltage. When the N-channel MOSFET 54 is turned off, a 100KΩ resistor 66 coupled across the source 57 and gate 58 of the P-channel MOSFET 52, forces the gate/source voltage $V_{gs}$ to drop to zero turning off the P-channel MOSFET 52. When the P-channel MOSFET 52 is turned off, the Shottky diode 50 becomes forward biased so that power is provided to the read/write memory 30 from the backup battery 42.

The circuit 40 ensures that a minimum voltage is provided to the read/write memory 30 during operation of the printer 20 and while the printer is in its standby mode so that the information stored in the memory 30 is maintained therein intact and not corrupted. Further, the circuit 44 prevents leakage current from the Lithium battery 42 from flowing through the circuit 44 so that the circuit 44 does not contribute to the depletion of the backup battery 42. Many modifications and variations of the present invention are possible in light of the above teachings. For example, instead of employing field effect transistors on MOSFETs 52 and 54, the circuit 44 may use other P-type and N-type transistors such as a PNP transistor and NPN transistor connected in a manner similarly as described above for the respective transistors 52 and 54. Thus, it is to be understood that, within the scope of the appended claims, the invention may be practiced otherwise than as described hereinabove.

What is claimed and desired to be secured by letters patent is:

1. In a portable barcode printer, an improved circuit for coupling power to a printer memory comprising:

a read/write memory storing information for controlling one or more operations of said barcode printer;

a main battery coupled to said memory;

a backup battery coupled to said memory;

a circuit coupled between said main battery and said memory to provide power from said main battery to said memory under normal conditions and said circuit being coupled between said main battery and said back up battery, said circuit comprising:

a P-channel field effect transistor having a gate, a source and a drain; and a N-channel field effect transistor having a source coupled to a ground, a gate and a drain; wherein the drain of said P-channel field effect transistor is coupled to the main battery, the source of the P-channel field effect transistor is coupled to the memory and the gate of the P-channel field effect transistor is connected to the drain of the N-channel field effect transistor so that when said N-channel field effect transistor is turned on said P-channel field effect transistor is turned on and saturated to allow a positive current flow from the drain to the source of said P-channel field effect transistor when said main battery is providing power to said memory.

2. A circuit in a portable barcode printer as recited in claim 1 wherein the gate of said N-channel field effect transistor is coupled to said main battery so as to be responsive to a gate signal generated therefrom.

3. A circuit in a portable barcode printer as recited in claim 2 wherein the gate of the N-channel field effect transistor is connected to ground through a resistor to dissipate charge from said gate when said transistor is to be turned off.

4. A circuit in a portable barcode printer as recited in claim 1 including a resistor connected across the source and gate of said P-channel field effect transistor.

5. A circuit in a portable barcode printer as recited in claim 1 wherein the gate of said N-channel field effect transistor is connected between a gate signal generator that generates a gate signal to turn said transistor on and a resistor connected to ground.

6. A circuit in a portable barcode printer as recited in claim 1 wherein said backup battery is coupled to said memory through a resistor in series with a diode wherein a cathode of the diode is coupled to the source of said P-channel field effect transistor and said memory.

7. In a portable barcode printer, an improved circuit for coupling power to a printer memory comprising:
   a read/write memory storing information for controlling one or more operations of said barcode printer;
   a main battery coupled to said memory;
   a backup battery coupled to said memory;
   a circuit coupled between said main battery and said memory to provide power from said main battery to said memory under normal conditions and said circuit being coupled between said main battery and said back up battery, said circuit comprising:
     a P-channel field effect transistor having a gate, a source and a drain;
     a N-channel field effect transistor having a source coupled to a ground, a gate and a drain; wherein the drain of said P-channel field effect transistor is coupled to the main battery, the source of the P-channel field effect transistor is coupled to the memory and the gate of the P-channel field effect transistor is connected to the drain of the N-channel field effect transistor so that when said N-channel field effect transistor is turned on said P-channel field effect transistor is turned on and saturated to allow a positive current flow from the drain to the source of said P-channel field effect transistor when said main battery is providing power to said memory;
     a first resister connected between the gate of said N-channel field effect transistor and ground; and
     a second resistor connected between the source and the gate of said P-channel field effect transistor.

8. A circuit in a portable barcode printer as recited in claim 7 wherein the gate of said N-channel field effect transistor is coupled to said main battery so as to be responsive to a gate signal generated therefrom.

9. A circuit in a portable barcode printer as recited in claim 7 wherein the gate of said N-channel field effect transistor is connected between a gate signal generator that generates a gate signal to turn said N-channel field effect transistor on and said first resistor.

10. A circuit in a portable barcode printer as recited in claim 7 wherein said backup battery is coupled to said memory through a resistor in series with a diode wherein the cathode of the diode is coupled to the source of said P-channel field effect transistor.

11. In a portable barcode printer, an improved circuit for coupling power to a printer memory comprising:
   a read/write memory storing information for controlling one or more operations of said barcode printer;
   a main battery coupled to said memory;
   a backup battery coupled to said memory;
   a circuit coupled between said main battery and said memory to provide power from said main battery to said memory under normal conditions and said circuit being coupled between said main battery and said back up battery, said circuit comprising:
     a P-type transistor having a gate and a first terminal and a second terminal between which current flows when said P-type transistor is on, said first terminal being coupled to said main battery and said second terminal being coupled to said memory;
     a N-type transistor having a gate and a first terminal and a second terminal between which current flows when said N-type transistor is on, with said first terminal of the N-type transistor coupled to a ground, and said second terminal of the N-type transistor connected to the gate of said P-type transistor to turn said P-type transistor on so that the P-type transistor becomes saturated to allow positive current flow between the first and second terminals of said P-type transistor.

12. A circuit in a portable barcode printer as recited in claim 11 wherein the voltage drop across said circuit is less than 0.5 Volts.

13. A circuit in a portable barcode printer as recited in claim 11 wherein said P-type transistor is a P-channel field effect transistor.

14. A circuit in a portable barcode printer as recited in claim 11 wherein said P-type transistor is a P-channel MOSFET.

15. A circuit in a portable barcode printer as recited in claim 11 wherein said N-type transistor is a N-channel field effect transistor.

16. A circuit in a portable barcode printer as recited in claim 11 wherein said N-type transistor is a N-channel MOSFET.

17. A circuit in a portable barcode printer as recited in claim 11 wherein the gate of said N-type transistor is coupled to said main battery so as to be responsive to a gate signal generated therefrom.

18. A circuit in a portable barcode printer as recited in claim 11 wherein the gate of the N-type transistor is connected to ground through a resistor to dissipate charge from said gate when said transistor is to be turned off.

19. A circuit in a portable barcode printer as recited in claim 11 wherein the gate of said N-type transistor is connected between a gate signal generator that generates a gate signal to turn said transistor on and a resistor connected to ground.

20. A circuit in a portable barcode printer as recited in claim 11 including a resistor connected across the second terminal and gate of said P-type transistor.

* * * * *

UNITED STATES PATENT AND TRADEMARK OFFICE
CERTIFICATE OF CORRECTION

PATENT NO.: 5,866,023
DATED: July 3, 1997
INVENTORS: Monson

It is certified that error appears in the above-identified patent and that said Letters Patent is hereby corrected as shown below:

```
On the title page, item [75] Inventors;
```

Add -- David Arnold Liebrecht -- as an inventor.

Signed and Sealed this

Twenty-first Day of September, 1999

*Attest:*

Q. TODD DICKINSON

*Attesting Officer*    Acting Commissioner of Patents and Trademarks